No. 710,222. Patented Sept. 30, 1902.
J. SWANSON.
GRASS CUTTING MACHINE.
(Application filed Jan. 20, 1902.)
(No Model.) 2 Sheets—Sheet 2.
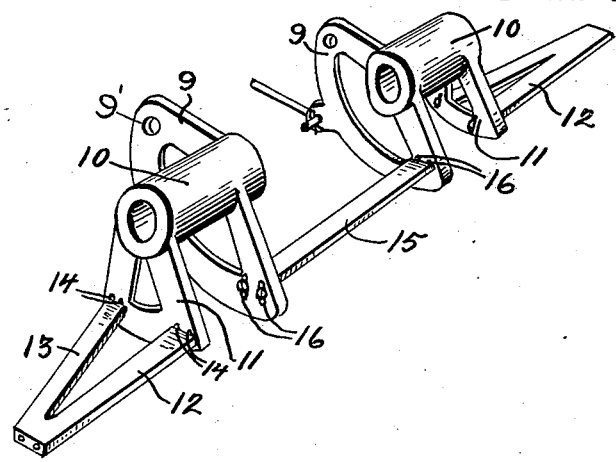
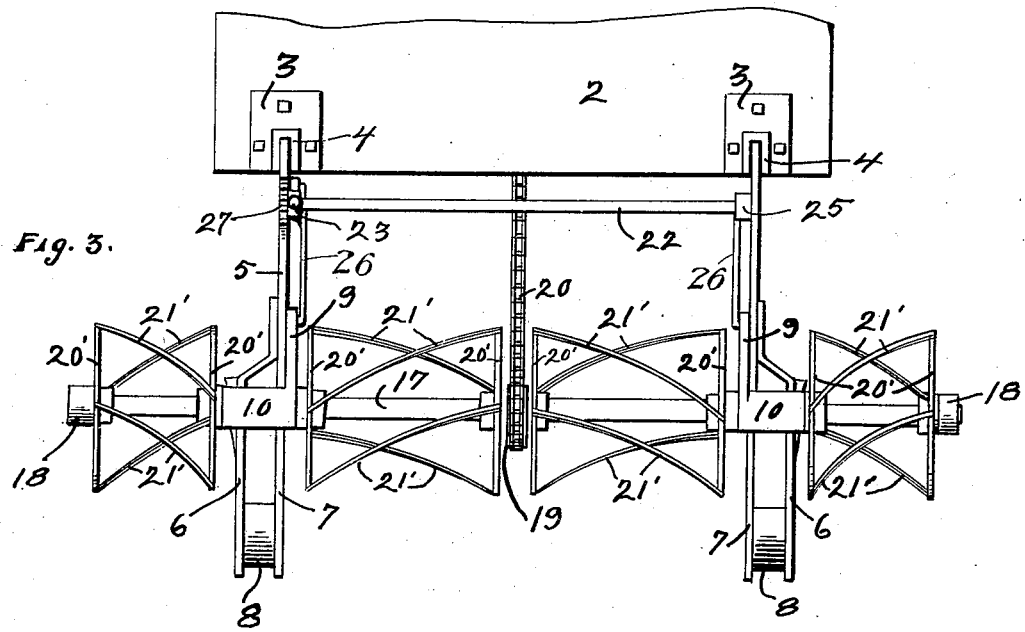
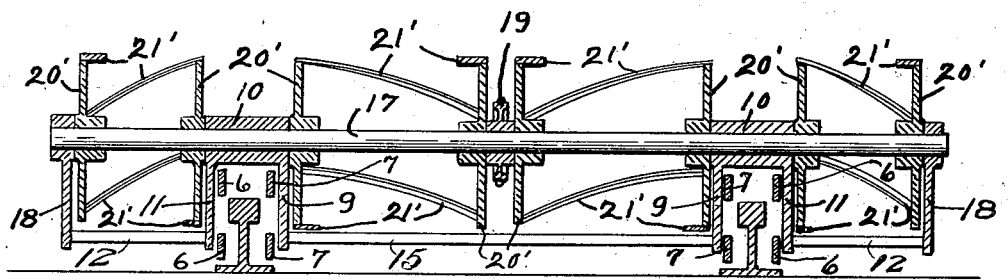
WITNESSES. INVENTOR
JOHN SWANSON.
BY
ATTORNEYS.

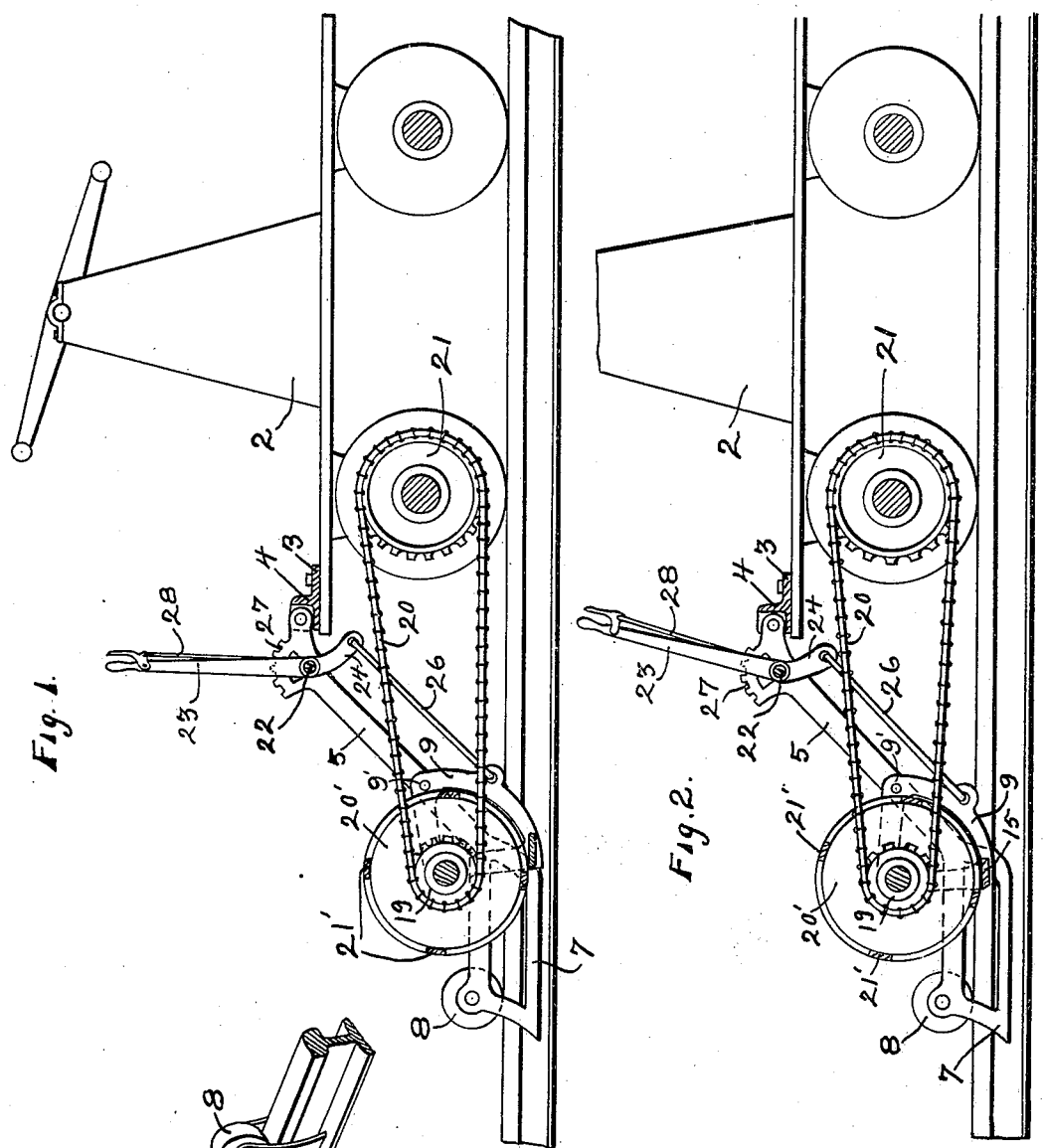

UNITED STATES PATENT OFFICE.

JOHN SWANSON, OF WADENA, MINNESOTA.

GRASS-CUTTING MACHINE.

SPECIFICATION forming part of Letters Patent No. 710,222, dated September 30, 1902.

Application filed January 20, 1902. Serial No. 90,395. (No model.)

*To all whom it may concern:*

Be it known that I, JOHN SWANSON, of Wadena, in the county of Wadena, Minnesota, have invented certain new and useful Improvements in Grass-Cutting Machines; of which the following is a specification.

Many railroads, particularly those running through the western prairies, are troubled more or less with grass that grows between the ties both inside and outside the rails. This grass, if allowed to grow, will not only present an untidy appearance to the road-bed, but will frequently get under the wheels and interfere with the movement of a train. It has been customary heretofore to cut this grass with sickles or scythes, which has proved to be a very tedious and laborious operation. The object, therefore, of my invention is to provide an apparatus adapted to rest upon the rails and by means of which the grass between and outside the rails can be rapidly and effectually cut.

Other objects of the invention will appear from the following detailed description.

The invention consists generally in various constructions and combinations, all as hereinafter described, and particularly pointed out in the claims.

In the accompanying drawings, forming part of this specification, Figure 1 is a longitudinal section of a grass-cutting machine embodying my invention and applied to a hand-car. Fig. 2 is a similar view with the grass-cutting device partially raised to clear obstructions. Fig. 3 is a plan view. Fig. 4 is a transverse section. Fig. 5 is a perspective of a swinging frame and the fixed knives. Fig. 6 is a similar view of the parts that rest upon and travel over the rails.

In the drawings, 2 represents a hand-car of the ordinary type. At the forward end of this car I provide plates 3, having sockets or blocks 4, wherein the rear ends or forwardly-projecting bars 5 are pivoted. These bars extend down to a point near the tops of the rails and are provided with shoes 6 and 7, the former being adapted to travel along on the outside and the latter on the inside of the rail, and these shoes are preferably curved, as shown, to push the grass away from the rails in position to be cut by the knives. Between the shoes 6 and 7 at their forward ends I pivot rolls 8, which normally rest upon the tops of the rails.

9 represents quadrants connected to bars 5 by pivots 9', near the rails, and having long bearing-hubs 10, at the outer ends of which depending arms or brackets 11 are provided, whereon the fixed knives 12 are supported. These knives are braced by bars 13, which, with said knives, are vertically adjustable in slots 14 on said brackets. The quadrants 9 are connected by the fixed knife 15, that is also vertically adjustable in slots 16 in said quadrants. A horizontal shaft 17 is mounted in the long bearings or hubs 10 and is provided at its outer ends with hangers 18, that are secured at their lower ends to the fixed knives 12 and aid in supporting the same. The knives 12 are outside the rails and the knife 15 inside, and all are vertically adjustable on their supports to permit their being set the proper working distance from the revolving knives.

Upon the shaft 17, preferably at a point intermediate to the quadrants 9, I provide a sprocket-wheel 19, that is connected by a chain 20 with a similar sprocket-wheel 21 on the forward axle of the car. These sprockets are of suitable size to drive the shaft at the desired speed, that of the car being ordinarily about four or five miles an hour, though a greater or less speed may of course be attained, if desired.

Secured on the shaft 17, both inside and outside the rails, are a series of disks 20', arranged in pairs, and these disks are connected by knives 21', corresponding to those employed on a lawn-mower and arranged upon the disks in substantially the same manner as upon the cylinder of a mower. These knives revolve with the disks and coöperate with the fixed knives to cut the grass as the apparatus is moved along.

In passing over switches or crossings it is necessary to provide means for raising the knives sufficiently to clear all obstructions, and I therefore provide a rod 22, connecting bars 5, near their pivoted ends, and provide on said rod at one end a lever 23, having a depending arm 24, and at the other end of said rod arrange an arm 25. These arms 24 and 25 are pivotally connected with the quadrants 9 by rods 26, so that when the lever is oscillated the quadrants and the knives supported thereby may be raised or lowered. Upon one of the bars 5 near said lever I provide a rack 27, that is engaged by a latch 28 on said lever.

In operation the device is secured to the forward end of the motor or car, with the wheels or rolls 8 resting upon the rails, so that the shoes will travel over the rail-flanges in position to gather up and push the grass away from the rails into the path of the revolving knives. The operator will then move the lever 23 and swing the quadrants on their pivots until the fixed and revolving knives are in their proper working position, the former having previously been adjusted the desired distance from the latter. The car or motor is then started, and as the apparatus moves over the rails the knives driven from the axle of the car will revolve rapidly and mow the grass between and outside the rails. Upon approaching a switch or crossing it is only necessary for the operator to move the lever sufficiently to raise the knives above the obstructions without stopping the car.

I do not wish to be confined to the use of this apparatus on a hand-car, as with a few modifications in the construction of the frames and the apparatus for raising the knives the device may be applied to a locomotive, where it can be controlled by the engineer and used in substantially the same manner as above described.

I claim as my invention—

1. The combination, with a car, of bars 5 pivoted thereon, rolls provided at the forward ends of said bars and adapted to rest upon the track-rails, curved shoes also carried by said bars and depending upon opposite sides of the rails to press the grass away from the same into the path of the knives, quadrants 9 pivoted on said bars and having long bearings or hubs 10, a shaft mounted in said bearings, a rotary knife provided on said shaft, means for driving said shaft from the car-axle, a fixed knife provided between said quadrants and adapted to coöperate with said rotary knife to cut the grass between the rails, and means for oscillating said quadrants on their pivots to swing said knives clear of any obstruction between the rails, substantially as described.

2. The combination, with a car, of bars pivoted thereon, rolls mounted in said bars and adapted to rest upon the track-rails, a frame pivoted on said bars, a shaft mounted in bearings in said frame, means for driving said shaft from the car-axle, a rotary knife mounted on said shaft between the rails, a stationary knife mounted in adjustable bearings on said frame and adapted to coöperate with said revolving knife to cut the grass between the rails, and means for oscillating said frame, for the purpose specified.

3. The combination, with a car, of a frame pivoted thereon, rolls carried by said frame and adapted to bear upon the track-rails, quadrants 9 pivoted on said bars between the track-rails, hubs 10 mounted on said quadrants and extending laterally therefrom, quadrants 11 provided on said hubs outside the track-rails, a shaft mounted in said hubs and operatively connected with the car-axle, rotary knives provided on said shaft near the middle and the ends thereof, stationary knives 12 and 15 provided on said quadrants 11 and 9 respectively and coöperating with said rotary knives to cut the grass between and outside the rails, hangers 18 provided on the ends of said shaft and supporting the outer ends of said fixed knives 12, and means for oscillating said quadrants 9 on their pivots to raise or lower said knives, substantially as described.

4. The combination, with a car, of the bars 5 pivoted thereon, the rolls carried by said bars and adapted to rest upon the track-rails, quadrants 9 pivoted on said bars and having long bearings or hubs, a shaft mounted in said bearings and driven from the car-axle, a stationary knife 15 supported between said quadrants 9, stationary knives 12 supported by said hubs, hangers connecting the outer ends of said knives 12 and said shaft, rotary knives mounted on said shaft and adapted to coöperate with said knives 12 and 15 to cut the grass outside and between the rails, and means for tilting said quadrants 9 on their pivots to swing said knives away from or toward the ground, for the purpose specified.

5. The combination, with a car, of bars pivoted thereon and supported at their forward ends upon the track-rails, a frame pivoted on said bars, a shaft mounted in bearings in said frame, means for driving said shaft from the car-axle, a rotary knife mounted on said shaft between the rails, a stationary knife carried by said frame and adapted to coöperate with said revolving knife to cut the grass between the rails, and means for oscillating said frame to swing said knives into or out of their working position.

6. The combination, with a car, of bars pivoted thereon, rolls carried by said bars and adapted to rest upon the track-rails, curved shoes provided on said bars and depending beside the rails to push the grass away from the same into the path of the knives, a frame pivoted on said bars, a shaft mounted in bearings in said frame, means for driving said shaft from the car-axle, a rotary knife mounted on said shaft between the rails, a stationary knife carried by said frame and adapted to coöperate with said revolving knife to cut the grass between the rails, and means for oscillating said frame to swing said knives to an operative or inoperative position.

In witness whereof I have hereunto set my hand this 11th day of January, 1902.

JOHN SWANSON.

Witnesses:
RICHARD PAUL,
M. C. NOONAN.